United States Patent [19]
Yamaguchi

[11] Patent Number: 5,244,052
[45] Date of Patent: Sep. 14, 1993

[54] STEERING CONTROL UNIT FOR MULTIPLE STEERABLE AXLES

[75] Inventor: Masayoshi Yamaguchi, Kameoka, Japan

[73] Assignee: Eaton Corporation, Cleveland, Ohio

[21] Appl. No.: 818,960

[22] Filed: Jan. 10, 1992

[30] Foreign Application Priority Data

Jan. 28, 1991 [JP] Japan ................. 3-26795

[51] Int. Cl.⁵ ............................................. B62D 5/06
[52] U.S. Cl. ........................... 180/132; 180/140; 180/149; 60/384; 137/625.23
[58] Field of Search ............ 180/132, 134, 140, 146, 180/149; 60/384; 137/625.23, 625.24; 251/283

[56] References Cited

U.S. PATENT DOCUMENTS

| | | | |
|---|---|---|---|
| 3,587,768 | 6/1971 | Ortheil | 180/146 |
| 4,140,199 | 2/1979 | Lester | 180/140 |
| 4,804,016 | 2/1989 | Novacek et al. | 137/625.23 |
| 4,936,094 | 6/1990 | Novacek | 180/149 |

FOREIGN PATENT DOCUMENTS 133285  5/1990  Japan ................. 180/149

Primary Examiner—Margaret A. Focarino
Assistant Examiner—Kevin Hurley
Attorney, Agent, or Firm—L. J. Kasper

[57] ABSTRACT

A hydraulic steering system is provided including a hydraulic steering unit (3) provided with a housing (6) having an inlet port (7), an outlet port (8), and a pair of control ports L and R. A measuring part (fluid meter) (19) includes an internally-toothed gear member (21) disposed in the housing, and an externally-toothed gear (22) disposed within the gear (21) to be in engagement therewith and have orbital and rotational movement therein. A changeover valve (9) controls the flow of fluid to and from the ports and through the measuring port. An input shaft (13) actuates the changeover valve (9), and an output shaft (24) is actuated by the torque out of the measuring part (19). A steering wheel (1) is connected by means of a steering column (2) to the input shaft (13) of the steering unit (3). A front wheel steering wheel is connected to the measuring part (19) by means of the output shaft (24), while the pair of control fluid ports L and R are connected to a rear wheel steering cylinder (58), through a changeover valve (57).

3 Claims, 2 Drawing Sheets

STEERING CONTROL UNIT FOR MULTIPLE STEERABLE AXLES

BACKGROUND OF THE DISCLOSURE

This application claims priority, under 35 USC 119, of earlier-filed Japanese application HEI3-26795, filed Jan. 28, 1991.

The present invention relates to a hydraulic (or hydrostatic) power steering device for a vehicle, and more particularly, to such a device for use on vehicles having multiple steerable axles.

In many off-highway vehicles, for example, various tractors and construction vehicles, it is desirable to be able to steer both the front and rear axles. More specifically, it is desirable to be able to steer the front axle in response to rotation of the vehicle steering wheel, and to control the steering of the rear axle by means of hydraulic cylinders and a multi-position control valve. As a result, the rear wheels may be turned in the same direction as the front wheels to provide "crab" steering, or the rear wheels may be turned in a direction opposite that of the front wheels, thus providing a sharper turning radius.

A typical prior art system of the type described above is illustrated in FIG. 3 of the present application, and is illustrated as including a conventional, well-known hydraulic steering unit for steering both the front and rear axles (wheels) of the vehicle. In the system shown in FIG. 3, a gear 50 is fitted on a column 2 connected to a steering wheel 1. A front wheel steering unit (not shown) is connected to the gear 50 through a connecting linkage or member 4. Another gear 51 meshes with the gear 50, and a shaft 52 of the gear 51 is connected to the input shaft of a known hydraulic steering unit 53. The hydraulic steering unit may be of the type illustrated and described in U.S. Pat. No. 4,804,016, assigned to the assignee of the present invention and incorporated herein by reference. A pair of control conduits 55 and 56 are connected to a pair of control ports L and R, respectively, provided in a housing 54 of the hydraulic steering unit 53. The conduits 55 and 56 are connected to an arrangement 58 of steering cylinders for steering the rear wheels through a changeover valve 57, so that the required pressurized fluid may be communicated to the cylinders 58. The reference numeral 59 indicates a fluid supply conduit, connected to an inlet port P of the steering unit, and the reference numeral 60 indicates a fluid discharge conduit connected to the outlet port T of the hydraulic steering unit 53. The fluid supply conduit 59 receives pressurized fluid from a pump 61 while the fluid discharge conduit 60 returns fluid to a system reservoir 63.

Among the types of front wheel steering units which are well known, and therefore not illustrated or described herein, are those of the integral gear or semi-integral gear type, as well as those of the linkage type.

Among the problems associated with the prior art steering system shown in FIG. 3, and just described, is that steering torque input to the front wheel steering unit, and steering torque for input to the hydraulic steering unit 53 are additive, i.e., the total torque input required is merely the sum of the two individual torques.

Another problem with such systems is that the arrangement of gears 50 and 51 would subject the input shaft of the steering unit 53 to a substantial sideload, which is not desirable in such steering units. Therefore, the shaft 52 must be supported by a bearing arrangement capable of preventing the radial loads acting on the shaft 52 from causing any radial deflection thereof. Such a bearing arrangement typically adds substantial expense to the system, and takes up a substantial amount of space.

SUMMARY OF THE INVENTION

Accordingly, it is an object of the present invention to provide a steering control unit for multiple steerable axles which overcomes the problems and disadvantages of the prior art steering system.

It is a more specific object of the present invention to provide such a steering control unit which achieves the above-stated object, while requiring substantially less input torque and taking up substantially less space than in the prior art system.

The above and other objects of the present invention are accomplished by the provision of a fluid controller of the type including housing means defining a fluid inlet port, a fluid outlet port, and first and second control fluid ports. An internally-toothed gear member is disposed in the housing means, and a measuring member comprising an externally-toothed gear member is disposed within the internally-toothed gear member and in engagement therewith, and disposed for relative orbital and rotational movement therein. A valve means is operable to control the flow of fluid from the fluid inlet port to the first control fluid port, through the measuring member, and from the second control fluid port to the fluid outlet port. An input shaft is operable to operate the valve means, and an output shaft is adapted to be actuated by the measuring member, the input shaft being adapted for connection to a steering column, and the output shaft being adapted for connection to a front wheel steering unit. The first and second control fluid ports are in fluid communication with a rear wheel steering cylinder.

In accordance with a more specific aspect of the present invention, when the steering wheel is rotated by the vehicle operator, fluid flows into the housing of the hydraulic steering unit through the inlet port, then flows though the changeover valving, and then to the control port. The fluid flow is controlled proportional to the amount of rotation of the steering wheel, as measured by the measuring part. The output shaft is connected to the measuring part, and therefore, rotation of the measuring part is transmitted to the output shaft and rotation of the output shaft is transmitted to the front wheel steering unit. Therefore, steering torque required at the front wheel steering unit is generated in response to hydraulic pressure in the steering unit, so that the vehicle operator can steer the vehicle with relatively little input steering torque.

DESCRIPTION OF THE PREFERRED EMBODIMENT

Figure 1:
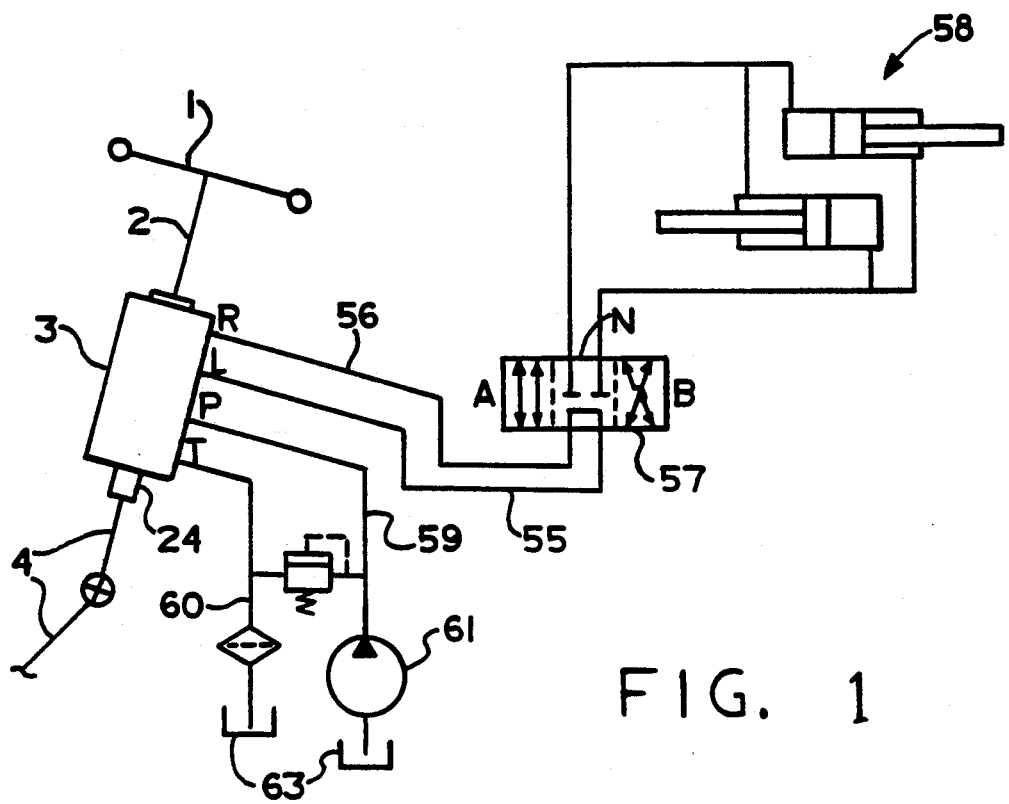
FIG. 1 is a hydraulic schematic of a steering system made in accordance with the present invention.
Figure 3:
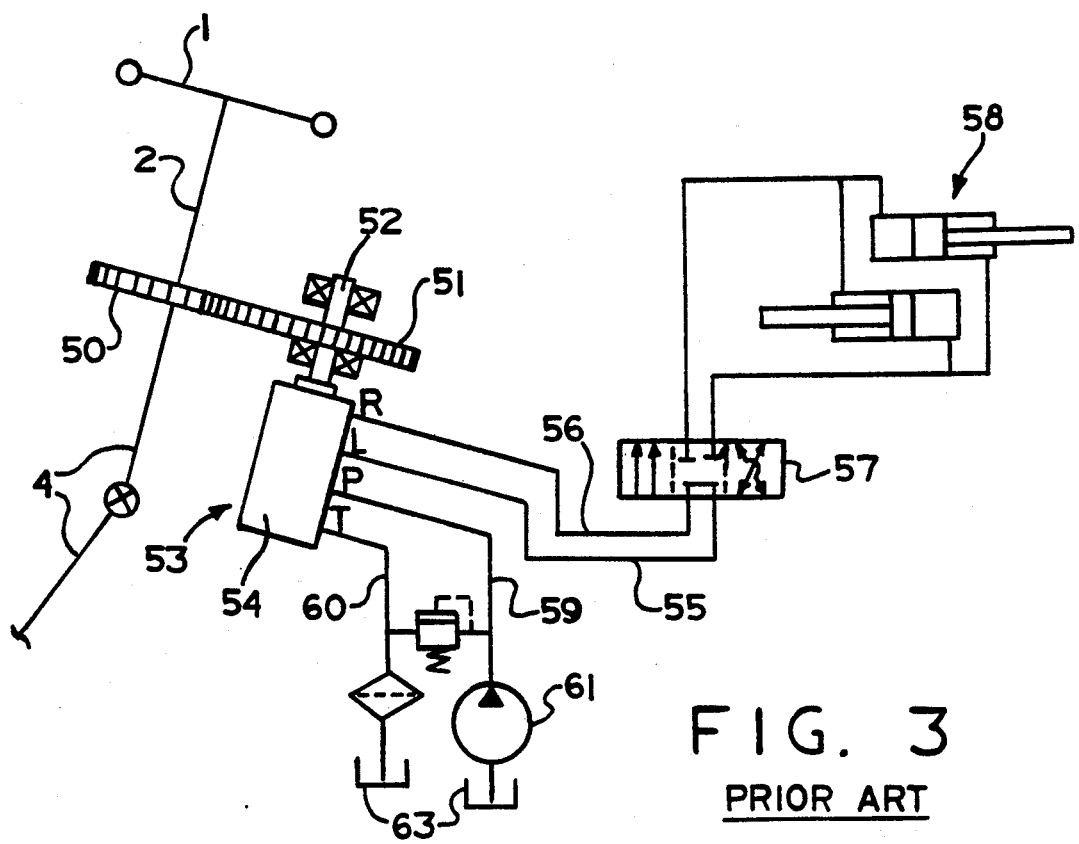
FIG. 3 is a hydraulic schematic, similar to FIG. 1, illustrating the typical prior art system.
Figure 2:
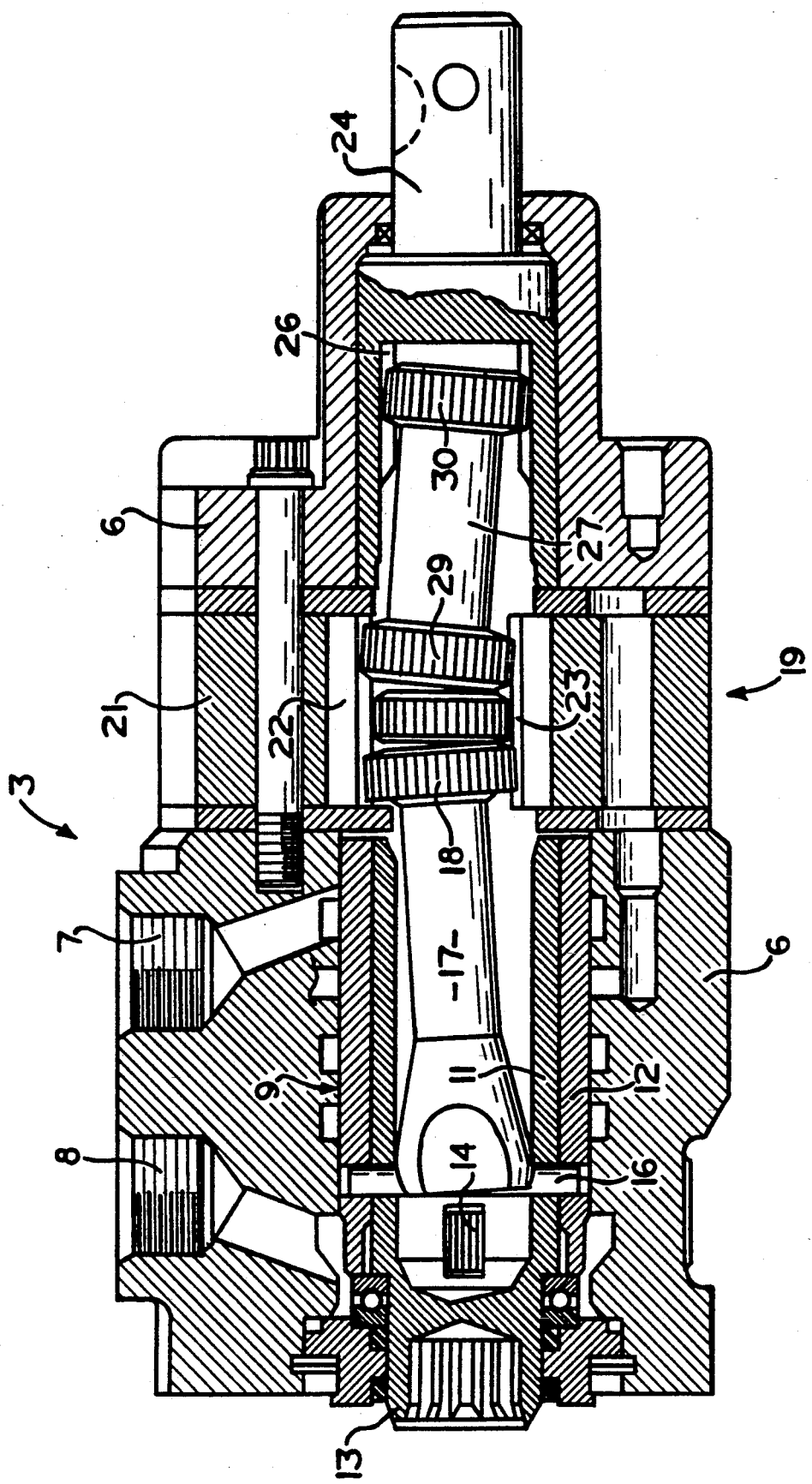
FIG. 2 is an axial cross section of the fluid controller, shown schematically in FIG. 1, and made in accordance with the present invention.

Referring now primarily to FIGS. 1 and 2, the steering system and fluid controller of the present invention will be described in greater detail. Certain of the elements previously described in connection with the prior system of FIG. 3 are also present, and bear the same reference numerals, in the system shown in FIG. 1. Those element already introduced in connection with FIG. 3 will be described only briefly hereinafter.

Referring now primarily to FIG. 1, the system illustrated therein includes a hydraulic steering unit 3 (fluid controller), which will be described in greater detail subsequently. In FIG. 1, it may be seen that the vehicle steering wheel 1 directly drives the input shaft (to be introduced subsequently) of the steering unit 3, by means of the steering column 2.

Referring now primarily to FIG. 2, the steering unit 3 includes a housing 6 which is provided with an inlet port 7, an outlet port 8, and a pair of control fluid ports L and R, shown in FIG. 1, but not in FIG. 2. A changeover valve 9 is rotatably disposed in the central bore of the housing 6 and includes a rotatable spool 11 as well as a sleeve 12 acting in cooperation with the spool. At the forward end of the spool 11 (left end in FIG. 2) is an input shaft portion 13 to which the steering column 2 is connected. A centering spring arrangement, generally designated 14, has both ends inserted through holes formed in the spool 11 and sleeve 12, the function of the centering spring 14 being to return the spool 11 and sleeve 12 to their relative neutral position.

A driving pin 16 has both ends inserted into a through hole of the spool 11, and received in and supported by through holes of the sleeve 12. The driving pin 16 is driven by a first driving shaft 17. The forward end of the first driving shaft 17 includes a bifurcated portion, through which the driving pin 16 extends, and on the rearward end of the driving shaft 17 there is a set of external splines 18. The steering unit 3 includes a measuring part (fluid meter) 19 which includes an internally-toothed gear member 21, and an externally-toothed gear member 22, disposed eccentrically within the internally-toothed gear 21, meshing with the gear 21, and having one less tooth than the gear member 21. The externally-toothed gear 22 rotates about its own axis, and revolves or orbits about the axis of the internally-toothed gear 21. The externally-toothed gear 22 includes a set of internal splines 23, in engagement with the external splines 18 of the first driving shaft 17.

Disposed toward the rearward end of the steering unit 3 (right end in FIG. 2), an output shaft 24 is rotatably disposed within the output end of the housing 6, the output shaft 24 defining a set of internal splines 26. A second driving shaft 27 has a set of external splines 29 in engagement with the internal splines 23, and a set of external splines 30 in engagement with the set of internal splines 26. As may best be seen in FIG. 1, the output shaft 24 is adapted to be attached to the connecting member or linkage 4.

The hydraulic steering unit 3, as illustrated in FIG. 2 and described above, is somewhat similar in construction and function to a device known as a "torque generator", and sold commercially by the assignee of the present invention. A typical, prior art torque generator is illustrated and described in greater detail in U.S. Pat. No. 4,936,094, assigned to the assignee of the present invention, and incorporated herein by reference.

The changeover valving 9, comprising the spool 11 and sleeve 12, is not illustrated and described in great detail herein. It should be noted, however, that the changeover valving 9 of the present invention is unlike the valving in the typical torque generator, as illustrated in above-incorporated U.S. Pat. No. 4,936,094. Instead, the changeover valving 9 of the present invention is more similar to that found in a conventional full fluid-linked steering control unit of the type sold commercially by the assignee of the present invention. Such changeover valving is illustrated and described in greater detail in above-incorporated U.S. Pat. No. 4,804,016.

Operation

Referring again primarily to FIG. 1, when the changeover valve 57 is put in the neutral position N, as shown in FIG. 1, the rear wheels are locked because flow to and from the cylinders 58 is blocked, and only the two front wheels are steered, by means of the connecting member 4. When the changeover valve 57 is in the position designated A in FIG. 1, flow to the steering cylinders 58 results in the rear wheels turning in the same direction as the front wheels, thus resulting in what is commonly referred to as "crab" steering. When the changeover valve 57 is in the position designated B in FIG. 1, the flow to the steering cylinders 58 results in the rear wheels turning in the opposite direction as the front wheels, thus resulting in a tighter turning radius.

When the vehicle operator turns the steering wheel 1, the spool 11 is displaced relative to the sleeve 12, in opposition to the biasing force of the centering spring 14. As a result of such rotational displacement, fluid flowing into the housing 6 through the inlet port 7 flows through a series of variable orifices in the changeover valve 9 (i.e., at the interface of the spool 11 and sleeve 12), such that the flow area of the orifices is generally proportional to the amount of rotation of the steering wheel. Stated another way, the flow of fluid through the measuring part 19 is generally proportional to the rate of displacement of the steering wheel 1. After flowing through the measuring part 19, the fluid flows out one of the control fluid ports L or R (depending on the direction of rotation of the steering wheel 1), and flows to the changeover valve 57. In other words, fluid flow through the measuring part 19 (to provide front wheel steering) and fluid flow through the changeover valve 57 (to accomplish rear wheel steering) are in series hydraulically, such that there is a generally predictable relationship between the movement of the front wheel steering unit 4 and the movement of the rear wheel steering cylinder arrangement 58. As the pressurized fluid flows through the measuring part 19, the externally-toothed gear 22 orbits and rotates within the gear 21 and turns the first driving shaft 17, the driving pin 16, and the sleeve 12, thereby maintaining a relative rotational displacement between the spool 11 and sleeve 12, corresponding to the rate of rotation of the steering wheel 1. When rotation of the steering wheel stops, the follow-up movement of the sleeve 12, aided by the centering spring 14, causes the sleeve to return to a neutral position, relative to the spool 11.

At the same time, the second driving shaft 27 is being rotated by the externally-toothed gear 22, such rotational motion being transmitted through the external splines 27 and internal splines 26 to the output shaft 24. Typically, there is a phase difference or slight "lost motion" between the rotation of the steering wheel 1 and the rotation of the externally-toothed gear 22. However, the phase difference is basically equal to the relative rotational displacement between the spool 11 and sleeve 12, and typically is approximately 10°, and therefore, in the context of the steering system, is almost negligible. Rotation of the output shaft 24 is transmitted to the front wheel steering unit through the connecting member 4. However, very little input torque is required because of the torque transmitted to the externally-toothed gear 22 by the pressurized fluid in the measuring part 19. Therefore, only a small amount of input torque is required by the vehicle operator, and typically, only approximately the amount of torque required to overcome the biasing force of the centering spring 14.

It should be apparent to those skilled in the art that the steering system and fluid controller of the present invention provides steering control for a vehicle having multiple steerable axles. Furthermore, with the present invention, relatively little input steering torque is required by the vehicle operator, substantially less space is required for the installation of the system, and the system and fluid controller can be provided at substantially less expense than the prior art system.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A fluid controller of the type including housing means defining a fluid inlet port, a fluid outlet port, and first and second control fluid ports; an internally-toothed gear member disposed in said housing means, and a measuring member comprising an externally-toothed gear member disposed within said internally-toothed gear member and in engagement therewith, and disposed for relative orbital and rotational movement therein; valve means operable to control the flow of fluid from said fluid inlet port to said first control fluid port, and from said second control fluid port to said fluid outlet port, and through said measuring member; an input shaft operable to actuate said valve means, and an output shaft adapted to be actuated by said measuring member, the input shaft being adapted for connection to a steering column, and said output shaft being connected to a mechanical front wheel steering unit; said first and second control fluid ports being in fluid communication with a rear wheel steering cylinder.

2. A steering system of the type comprising a source of pressurized fluid, a steering input device, a mechanical front wheel steering unit, a rear wheel steering cylinder, and a steering controller operable, in response to movement of the steering input device to provide steering movement to the front wheel steering unit, and to control the flow of fluid to the rear wheel steering cylinder; said steering controller comprising housing means defining a fluid inlet port, adapted for connection to the source of pressurized fluid, a fluid outlet port adapted for connection to a system reservoir, and first and second control fluid ports adapted for connection to the rear wheel steering cylinder; valve means disposed in said housing means, and being movable from a neutral position to an operating position, in response to movement of the steering input device, in which said valve means and said housing means cooperate to define a main fluid path providing fluid communication from said fluid inlet port to said first controller fluid port and from said second control fluid port to said fluid outlet port; a fluid pressure-actuated displacement means disposed in series flow relationship in said main fluid path, and comprising an internally-toothed gear member disposed in said housing means, and an externally-toothed gear member eccentrically disposed within said internally-toothed gear member for relative orbital and rotational movement therein in response to the flow of fluid through said main fluid path; an output shaft connected to the front wheel steering unit, and means operable to transmit torque from said externally-toothed gear member to said output shaft in response to the flow of fluid through said displacement means, whereby there is a generally predictable relationship between the movement of the front wheel steering unit and the movement of the rear wheel steering cylinder.

3. A steering system of the type comprising a source of pressurized fluid, steering input device, a mechanical steering unit, a fluid pressure operated steering device, and a steering controller operable, in response to movement of the steering input device, to provide steering movement to the mechanical steering unit, and to control the flow of fluid to the fluid pressure operated steering device; said steering controller comprising housing means defining a fluid inlet port, adapted for connection to the source of pressurized fluid, a fluid outlet port adapted for connection to a system reservoir, and first and second control fluid ports adapted for connection to the fluid pressure operated steering device; valve means disposed in said housing means, being movable from a neutral position to an operating position, in response to movement of the steering input device, in which said valve means and said housing means cooperate to define a main fluid path providing fluid communication from said fluid inlet port to said first control fluid port and from said second control fluid port to said fluid outlet port; a fluid pressure-actuated displacement means disposed in series flow relationship in said main fluid path, and comprising an internally toothed gear member disposed in said housing means, and an externally-toothed gear member for relative orbital and rotational movement therein in response to the flow of fluid through said main fluid path; an output shaft connected to the mechanical steering unit, and means operable to transmit torque from said externally-toothed member to said output shaft in response to the flow of fluid through said displacement means, whereby there is a generally predictable relationship between the movement of the mechanical steering unit and the movement of the fluid pressure operated steering device.

* * * * *